Jan. 23, 1945. W. W. HARTMAN 2,367,942
METHOD OF MAKING SOCKET WRENCHES
Filed Feb. 7, 1944 2 Sheets-Sheet 1

INVENTOR.
WILLIAM WALTER HARTMAN,
BY
ATTORNEY.

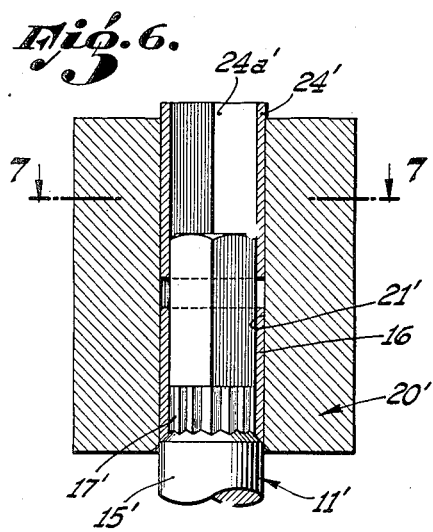
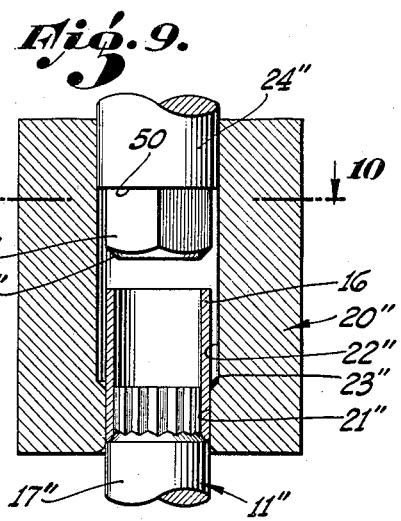
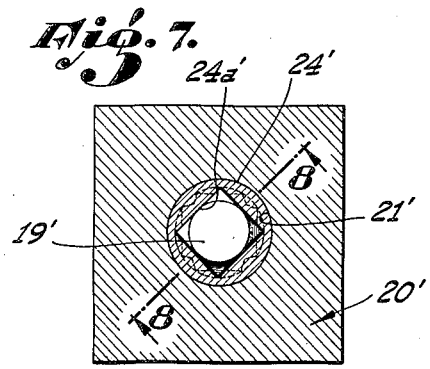
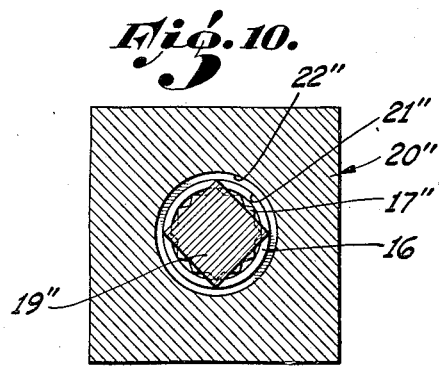
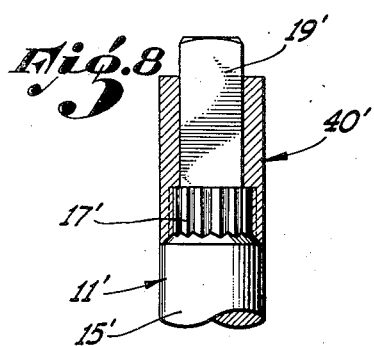
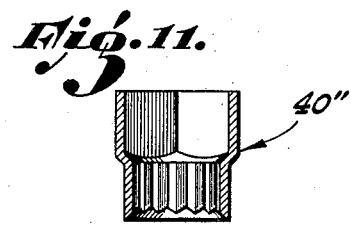

Patented Jan. 23, 1945

2,367,942

UNITED STATES PATENT OFFICE 2,367,942

METHOD OF MAKING SOCKET WRENCHES

William Walter Hartman, Los Angeles, Calif.

Application February 7, 1944, Serial No. 521,366

7 Claims. (Cl. 76—114)

This invention relates to methods of making socket wrenches, and is concerned particularly with simplification, speed-up, and improvement generally, in socket wrench manufacture.

The standard method of manufacturing socket wrenches is still the time worn process of boring a solid cylindrical bar of stock to form a major diametered opening extending inwardly from one end, and a minor diametered opening extending in from the other, and then broaching the walls of these two openings to shape them properly to fit respectively a bolt head or nut and a square handle member. This standard method necessarily wastes a large percentage of the stock, usually more than 50%, and furthermore, operations of this type are both time-consuming and expensive. Further, the tooling is expensive, broaches being a particularly expensive tool.

The present invention may be regarded generally as an improvement upon the method disclosed in my prior Patent No. 2,340,529, issued February 1, 1944. The method disclosed in my said prior patent involved, in its illustrative practice, the preparation of a tubular wrench blank having internal nut engaging faces and corners. Assuming that the socket is to be of the conventional "12-point" type, there will be twenty-four such faces, as will be understood. One end of this blank was then converted internally to a square socketed form by an upsetting operation, the internal nut engaging faces and corners in the other end portion of the blank being meanwhile held accurately to their initial form.

The object of the present invention may be stated to be to improve the process disclosed in my said prior patent by the elimination of the initial step of forming internal nut engaging faces and corners within the tubular blank. In other words, the object of the present invention is to provide for the making of socket wrenches starting with plain tubular blanks.

A present preferred practice of the present invention, outlined briefly, is as follows: A plain tubular wrench blank, of a predetermined length greater than the length dimension of the final wrench to be formed is first provided. This blank is then confined in a female die socket, and male die members of cross-sectional shapes complementary to the desired end sockets, e. g., one to receive a handle and the other to receive a bolt head or nut, are then inserted within the two end portions of the blank. Finally, an upsetting end pressure is applied to the blank, causing the blank to be shortened to the predetermined length of the wrench, and causing a lateral flow of the metal of the blank against and into conformity with the two male die members. Thus, with a minimum of stock and with a new minimum of operations, the final wrench is completed.

The invention will be best understood by now referring to the following detailed description of an illustrative practice thereof, reference for this purpose being had to the accompanying drawings, in which:

Fig. 6 is a view similar to a portion of Fig. 1 but showing a modification;

Fig. 7 is a section on line 7—7 of Fig. 6;

Fig. 8 is a section on line 8—8 of Fig. 7;

Fig. 9 is a section similar to a portion of Fig. 1, but showing another modification;

Fig. 10 is a section on line 10—10 of Fig. 9; and

Fig. 11 is a longitudinal sectional view of a socket wrench formed by the die means of Figs. 9 and 10.

Figure 1:
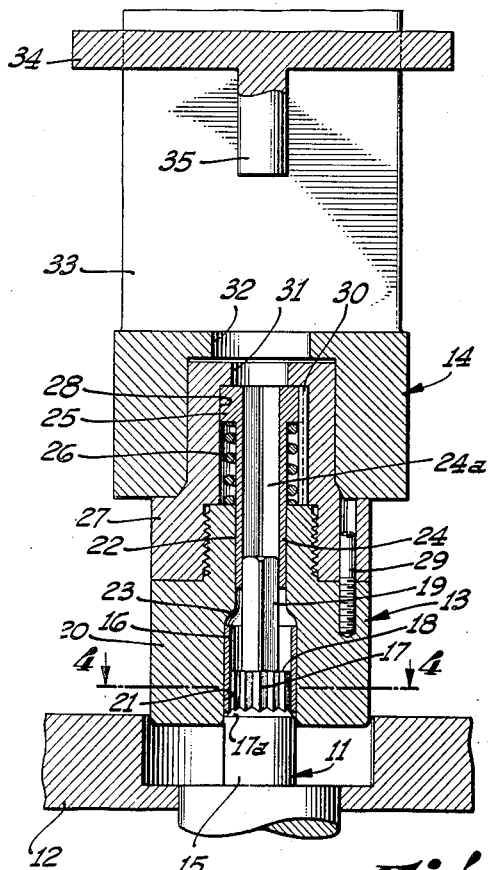
Fig. 1 is a fragmentary, partially elevational and partially sectional view of a pressing die structure used to form the tubular blanks into socket wrenches, the die being shown in the course of its operation, just before acting upon the tubing blank.

With reference particularly to Figs. 1 through 5, the forming or upsetting die structure comprises a male die member 11 set in a base 12 of a conventional press frame and a female die assembly 13 carried by a press frame 14. The die member 11 includes a cylindrical lower portion 15 equal in diameter to the outside diameter of the tubular blank 16, shown in position within the socket of the female die assembly 13, and understood to constitute a segment of round tubing, with a plain cylindrical bore. Above the cylindrical portion 15 is an intermediate ribbed portion 17 of complementary cross-sectional shape to the bolt head or nut receiving socket which is to be formed inside one end of the wrench. Assuming this socket is to be of the conventional "12-point" type, the section 17 will have twenty-four faces $f$, arranged at angles to form 12 points or ridges $r$, and 12 corners or angular grooves $c$ (see Fig. 4). This intermediate die section is preferably dimensioned so that it will just slide easily within the tubular blank 16. At the junction between the cylindrical portion 15 and the portion 17, the die 12 may be formed with a rudimentary bevel or fillet 17a. Above the portion 17, the die member 12 is reduced in diameter, so as to form an upwardly facing shoulder 18, above which extends a die stem 19 which is of the same cross-sectional shape as, and approximately the size of, the portion of the wrench handle which is intended to be received within the wrench handle socket to be produced. This stem may be of any desired polygonal shape, though it is preferably and here indicated as squared.

The upper or female die assembly 13 includes a female die block 20 having a bore 21 in its lower end adapted to receive the aforementioned blank 16 and the cylindrical portion 15 of the male die member 11 with a snug sliding fit, bore 21 being of a length equal to the finally desired length of the bolt head receiving portion of the finished socket wrench, and continuing from the inner end of the bore 21 is a reduced bore 22, the latter being equal in diameter to the desired diameter of the finished handle receiving portion of the socket wrench. The bores 21 and 22 are shown as connected by a faired inclined shoulder 23, and form the female die socket.

Slidably fitted within the bore 22 is an ejector tube 24 having a square opening 24a extending longitudinally therethrough and adapted to accommodate the stem 19 with sliding fit. The ejector tube is enlarged at its upper end to form a head 25, and between said head and the upper end of the die block is a spring 26 tensioned to hold the ejector tube at its uppermost position, as illustrated in Fig. 1.

The upper end of the die block 20 is reduced in diameter and externally threaded to receive a cap block 27 having a bore 28 adapted to accommodate the head of the ejector tube. The cap block is protected against rotation relative to the die block by a set screw 29, and the side of the bore 28 is provided with a key 30 coacting with the head 25 of the ejector tube 24 to hold it in alignment with squared stem 19.

Figure 3:
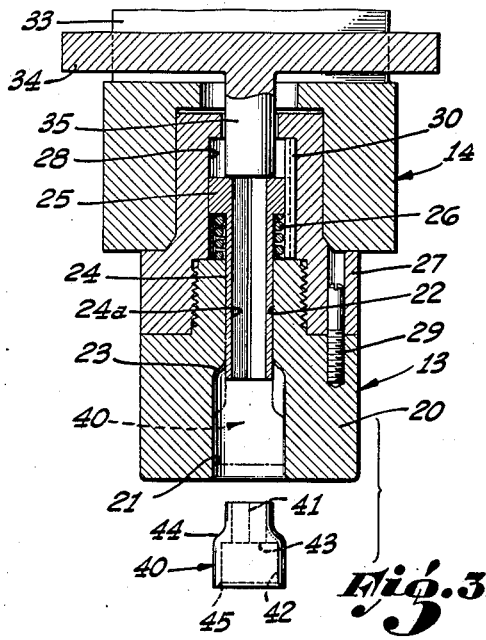
Fig. 3 is a view similar to a portion of Fig. 1, but showing the device in the course of its retraction, and showing the stripping action thereof.
Figure 4:
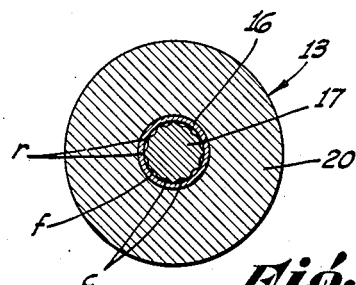
Fig. 4 is a transverse section on line 4—4 of Fig. 1.
Figure 2:
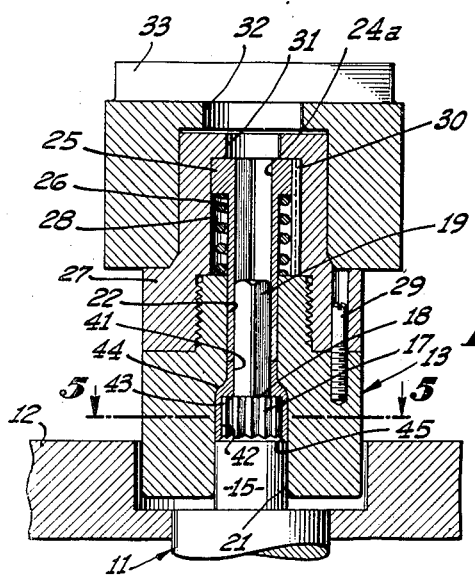
Fig. 2 is a view similar to a portion of Fig. 1, but showing the parts in the position assumed when the forming operation has just been completed.
Figure 5:
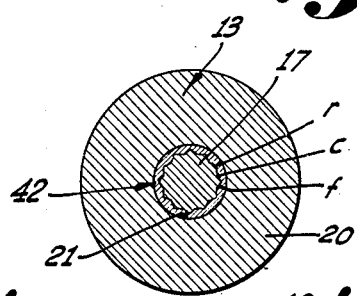
Fig. 5 is a transverse section on line 5—5 of Fig. 2.

The upper portion of the cap lock 27 is reduced in diameter and fitted in the press ram 14. An opening 31 is provided in the upper end of the cap lock, and this opening is smaller than head 25, so as to afford an internal flange limiting upward movement of the ejector tube. A registering opening 32 is provided in the ram 14, and the ram is provided with transverse clearance slot 33. In the particular press here shown for illustrative purposes, the press includes a fixed cross bar 34 received within the slot 33 and carrying a stop pin 35, which will engage the upper end of the ejector tube when the press ram is in its upper position, as shown in Fig. 3, whereby the socket wrench will be engaged by the lower end of the ejector tube and so ejected from the bore 21.

Operation of the forming die structure to form the tubular or cylindrical blank 16 of a predetermined length into the completed socket wrench will now be described. In Fig. 1, the blank 16, is shown in position on the die member 11, and the die block 20 has descended to the point at which the blank is about to be engaged by the shoulder 23. Preferably, particularly if high alloy steels are used, the blank is heated to a suitable forging temperature before introduction into the die, and is thus in a position to be upset and formed without undesirable weakening, as now to be described. The continued downward travel of the die block 20 below the position of Fig. 1 and to the position of Fig. 2 effects the application of an upsetting end pressure to the blank 16 through engagement of the upper end of the blank by the shoulder 23, with consequent downward and inward flow of the metal of the blank. The female die bore is also in effect, constricted in the region of the upper portion of the blank, since in the final position (Fig. 2) that region is defined by the reduced bore 22. The metal of the original blank is thus "squeezed" inwardly into the angular grooves $c$ of the ribbed die section 17, and inwardly to the squared die stem 19, finally fully occupying the space defined laterally by the ribbed and squared sections 17 and 19 of the male die and the bores 21 and 22 of the die block 20, and longitudinally by the lower end of the ejector tube 22 in its lowermost position (Fig. 2) and the bevel 17a. This space is calculated to be just equal in volume to the volume of metal in the blank 16, and the latter is squeezed by the die pressure, exerted through shoulder 23, to fully occupy and conform to said space.

As will be seen, the length of the blank as a whole has been substantially reduced to form the socket wrench, and while this is not an essential limitation of the process, in the specific embodiment here instanced, the upper end portion of the blank has been substantially reduced in diameter. The metal above the die shoulder 18 has been forced or displaced inwardly against the squared stem 19, which in effect defines the predetermined boundaries of the desired handle receiving socket. Thus the interior opening in the upper portion of the formed socket wrench, designated generally by the numeral 40, has a squared opening or handle receiving socket 41 conforming to the squared stem 19; and the interior opening in the lower portion of the wrench has been formed against the ribbed die section 17 to have a 12-point bolt head or nut receiving socket 42, conforming of course to the die section 17. At the juncture between the squared and 12-point sockets is a downwardly facing shoulder 43, while the outside of the wrench has a tapering shoulder 44, conforming to the die shoulder 23, connecting the unchanged exterior of the lower portion of the wrench with the reduced upper end portion, all as will be clear from an inspection of the drawings. The rim of the wrench socket around the 12-point socket has also been formed with a slight finishing inward bevel, as indicated at 45.

The single described movement of the die structure thus completes the forming operation. When the upper die assembly subsequently rises, the finished socket wrench 40 may remain within the die block 20, in which case it will be ejected as the parts reach the position of Fig. 3 by the ejector tube 24, which upon engagement with the stop pin 35 is arrested against further upward movement and accordingly frees the socket wrench from the die block, all as will be readily understood from an inspection of Fig. 3.

Attention is drawn to the fact that there is no wastage of material in the process, and that the manufacturing operations are reduced to a new minimum, with corresponding increase in speed of production. Moreover, the wrench as formed is inherently strong, and compares favorably in appearance and strength with wrenches manufactured by slower and more costly prior methods.

Figs. 6 through 8 show a modification by which socket wrenches may be manufactured in accordance with the invention without reduction in the diameter of the handle receiving portion thereof. Numeral 16 again designates the blank, and it will be understood that this blank may be the same as the blank of the previously described form of the invention. Numeral 11' designates the male die member, including cylindrical lower portion 15', equal in diameter to the outside diameter of the blank, intermediate rib portion 17' externally shaped like the section 17 of Fig. 1, and stem 19' of square cross-section extending upwardly above portion 17'. This entire die assembly, and the base therefor, may be exactly similar to that shown in Fig. 1, with the exception that the stem 19' is enlarged so that its diagonal dimension is just equal to the internal diameters of the tubular blank. The blank 16 will then just receive the stem 19' with a sliding fit.

The upper die assembly includes the female die block 20', only fragmentarily appearing in the drawings, having bore 21' adapted to receive the blank 16 and the cylindrical portion 15' of die 11' with a sliding fit. This bore 21' is not reduced, as in the case of Fig. 1, and is to be understood as extending upwardly throughout block 20' at uniform diameter. In other words, the bore 21 and reduced bore 22 of Fig. 1 are merely substituted for by a continuous bore 21' of uniform diameter extending from bottom to top of die block 20'. Slidably fitted within bore 21' is tube 24' having square opening 24a' adapted to accommodate stem 19' with sliding fit. This tube 24' will be understood as corresponding entirely to tube 24 of Fig. 1, excepting for the enlargement in diameter necessary to afford the sliding fit within bore 21', and excepting for the further fact that its lower end has not only an ejecting function, but also the function of upsetting the blank 16.

Excepting for the modifications noted, the die structure may be entirely similar to that illustrated in Fig. 1. The modified operation of the form of Figs. 6 through 8 is as follows: In the downward travel of the die block 20' and tube 24', the lower end of the latter engages the upper end of the blank, resulting in downward and inward deformation of the blank to conform it to the ribbed and squared die sections 17' and 19'. The result of the operation is illustrated in Fig. 8, the blank having been shortened and the metal thereof moved laterally inwardly to conform to the ribbed and squared die sections 17' and 19', respectively. The finished socket wrench 40' is similar to the socket wrench 40 of the first described form of the invention, with the exception that the outside diameter of its upper handle socketed portion has been maintained at the initial outside diameter of the original blank 16 and with the further exception that the handle socket is relatively larger in size than is the case in Figs. 1 through 5.

In Figs. 9 to 11 is illustrated a further modification, in which the handle-socketed end of the wrench is actually enlarged in diameter. In this instance, the male die member includes cylindrical portion 11" slidably receivable within bore 21" and ribbed section 17" dimensioned for reception within blank 16, which again is like the blank 16 of the first described embodiment. The male die member in this instance is not provided with a square shank like the shank 19 of Fig. 1.

The upper die structure includes die block 20", which is to be understood to be like the die block 20' of Fig. 1 excepting for noted modifications. The bore 21" extending upwardly into block 20" leads to an enlarging offset or outwardly and upwardly inclined shoulder 23", which connects bore 21" with a bore 22" of increased diameter. The bore 22" is to be understood as continuing upwardly through the upper end of the die block as does the bore 22 of Fig. 1.

The hollow ejector tube 24 of the embodiment of Fig. 1 is replaced by a solid cylindrical member 24", which, excepting for being solid rather than hollow, may have its upper end arrangements and mounting the same as those provided for the ejector tube 24 of Fig. 1. Additionally, the lower end of the cylinder 24" has an integrally formed downwardly projecting die punch or stem 19" of square cross-section and of a size equal to the desired wrench handle socket, which size in this instance is too great for entry inside the initial opening in the blank 16. The lower end of stem 19" has a tapered or beveled nose 19a" which is capable of entry inside the blank 16.

Operation of the embodiment of Figs. 9 through 11 is as follows: The descending die assembly, carrying with it the member 24" and squared stem 19", forces the latter inside the upper portion of the blank 16, expanding the blank to the diameter of the enlarged bore 22". The shoulder 50 at the juncture of stem 19" with cylindrical member 24" eventually engages the upper end of the blank, forcing the metal of the blank downwardly and laterally or inwardly so as to conform to the ribbed and squared die sections 17" and 19". Fig. 11 shows the completed socket 40" having the enlarged handle receiving socket portion.

As will appear, the several forms of my invention have in common the conforming of the interior of an initially plain tubular or cylindrical blank to a bolt head or nut receiving socket formation in one end and to a squared handle receiving socket formation in the other end by an upsetting operation which both shortens the length of the blank and moves metal thereof laterally to conform to the predetermined boundaries of the desired sockets. It will of course be understood that the present drawings and description are merely illustrative of the invention in certain of its present preferred forms, and that various changes may be made, particularly in the die apparatus utilized, without departing from the spirit and scope of the invention or of the appended claims.

I claim:

1. The method of making socket wrenches, which comprises preparing a tubular blank having a cylindrical bore and having a length which is a predetermined extent longer than the final socket wrench to be produced, confining said blank in a female die socket, and then applying an upsetting end pressure to said blank to shorten it to the predetermined length of the socket wrench and to cause a lateral displacement of metal to the predetermined boundaries of a handle receiving socket throughout the length of one end portion of the blank and to the predetermined boundaries of a bolt head or nut receiving socket throughout the other end portion of the blank.

2. The method of making socket wrenches, which comprises preparing a tubular blank having a cylindrical bore and having a length which is a predetermined extent longer than the final socket wrench to be produced, confining said blank in a female die socket, inserting a male die member of cross-sectional shape complementary to a desired handle receiving socket within one end portion of the blank and a male die member of cross-sectional shape complementary to a desired bolt head receiving socket within the other end portion of the blank, and then applying an upsetting end pressure to the blank to shorten it to the predetermined length of the socket wrench and to cause a lateral displacement of metal into full facial engagement with said male die members.

3. The method of making socket wrenches, which comprises preparing a tubular blank having a cylindrical bore, inserting a die member of cross-sectional shape complementary to a desired handle receiving socket within one end portion of the blank and a die member of cross-sectional shape complementary to a desired bolt head receiving socket within the other end portion of the blank, and then squeezing said blank to cause a lateral displacement of its metal throughout its length into full facial engagement with said die members.

4. The method of making socket wrenches, which comprises preparing a tubular blank having a cylindrical bore and having a length which is a predetermined extent longer than the final socket wrench to be produced, confining said blank in a female die socket, inserting within one end portion of the blank a male die member of cross-sectional shape complementary to the desired handle receiving socket and of dimensions capable of being received within the initial bore of the blank, and within the other end portion of the blank a male die member of cross-sectional shape complementary to the desired bolt head receiving socket and of dimensions capable of being received within the initial bore of the blank, and then applying an upsetting end pressure to the blank to shorten it to the predetermined length of the socket wrench and to cause a lateral displacement of metal into full facial engagement with said male die members.

5. The method of making socket wrenches, which comprises preparing a tubular blank having a cylindrical bore and having a length which is a predetermined extent longer than the final socket wrench to be produced, confining said blank in a female die socket, one end portion of which is dimensioned to snugly receive one end portion of the tubular blank and the other end portion of which is oversized, inserting a male die member of cross-sectional shape complementary to a desired socket within said one end portion of said tubular blank, inserting within the other end portion of the blank an oversized male die member of cross-sectional shape complementary to a desired socket, whereby the last mentioned end portion of the blank is expanded, and then applying an upsetting end pressure to the blank to shorten it to the predetermined length of the blank and to cause a lateral displacement of metal into full facial engagement with said male die members.

6. The method of making socket wrenches, which comprises preparing a tubular blank having a cylindrical bore and having a length which is a predetermined extent longer than the final socket wrench to be produced, confining said blank in a female die socket dimensioned to snugly receive said blank throughout the length thereof, inserting within one end portion of the blank a male die member of cross-sectional shape complementary to the desired handle receiving socket and of dimensions capable of being received within the initial bore of the blank, and within the other end portion of the blank a male die member of cross-sectional shape complementary to the desired bolt head receiving socket and of dimensions capable of being received within the initial bore of the blank, and then applying an upsetting end pressure to the blank to shorten it to the predetermined length of the socket wrench and to cause a lateral displacement of metal into full facial engagement with said male die members.

7. The method of making socket wrenches, which comprises preparing a tubular blank having a cylindrical bore and having a length which is a predetermined extent longer than the final socket wrench to be produced, confining said blank in a female die socket dimensioned to snugly receive said blank throughout the length thereof, inserting within one end portion of the blank a male die member of cross-sectional shape complementary to the desired handle receiving socket and of dimensions capable of being received within the initial bore of the blank, and within the other end portion of the blank a male die member of cross-sectional shape complementary to the desired bolt head receiving socket and of dimensions capable of being received within the initial bore of the blank, and then applying an upsetting end pressure to the blank and at the same time constricting said female die socket in the region about the first-mentioned male die member, to shorten said blank to the predetermined length of the socket, reduce its diameter in the region of the handle receiving socket and cause a lateral displacement of metal into full facial engagement with said male die members.

WILLIAM WALTER HARTMAN.